(12) United States Patent
Holt

(10) Patent No.: US 9,689,379 B2
(45) Date of Patent: Jun. 27, 2017

(54) POTENTIAL ENERGY TRANSLATION TO ROTATIONAL ACCELERATION MECHANISM

(71) Applicant: Patrick Holt, Harvard, IL (US)

(72) Inventor: Patrick Holt, Harvard, IL (US)

(*) Notice: Subject to any disclaimer, the term of this patent is extended or adjusted under 35 U.S.C. 154(b) by 324 days.

(21) Appl. No.: 14/530,626

(22) Filed: Oct. 31, 2014

(65) Prior Publication Data

US 2015/0233359 A1 Aug. 20, 2015

Related U.S. Application Data

(60) Provisional application No. 61/962,162, filed on Nov. 1, 2013.

(51) Int. Cl.
*F03G 3/06* (2006.01)

(52) U.S. Cl.
CPC .................................... *F03G 3/06* (2013.01)

(58) Field of Classification Search
CPC .................................... F03G 3/00; F03G 3/06
See application file for complete search history.

(56) References Cited

U.S. PATENT DOCUMENTS

| 3,250,140 A * | 5/1966 | Russell | F03G 3/00 |
| | | | 185/29 |
| 2008/0245182 A1* | 10/2008 | Feltenberger | F03G 3/06 |
| | | | 74/99 R |

FOREIGN PATENT DOCUMENTS

CA 2504482 A1 * 3/2005 ............... F03G 3/06

* cited by examiner

*Primary Examiner* — Phillip A Johnson

(57) ABSTRACT

A mechanism to create rotational mechanical advantage from an acceleration field consisting of a gravity arm assembly (14) rotationally connected in a horizontal plane to a gimbal assembly (41). A powered action arm assembly (21) rotationally connected in a horizontal plane, adjacent to the first arm assembly, to the gimbal assembly (41). A counterweight arm assembly (72), connecting at one end to a gearbox assembly (64) and connecting at the opposite end to an attachment mounting assembly (87), all vertically connected to the gimbal assembly (41). A mounting stand assembly (80) to rotationally connect to the gimbal assembly (41). An electrical control assembly (100) to controllably power the action arm assembly. The gravity arm and action arm assemblies are balanced about the gimbal assembly by the counterweight arm assemblies. The action arm assembly rotates about the axis of the gravity arm assembly, creating an imbalance in the gimbal assembly, causing the gravity arm assembly to rotate, and the counterweight arm assembly to swing, all in the same direction of the action arm assembly.

18 Claims, 3 Drawing Sheets

POTENTIAL ENERGY TRANSLATION TO ROTATIONAL ACCELERATION MECHANISM

CROSS REFERENCE TO RELATED APPLICATIONS

Figure 1:
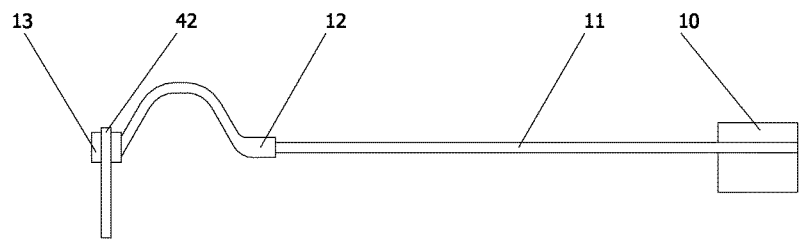

This application claims the benefit of Provisional Patent Application Serial No. 61/962,162-1213, filed Nov. 2, 2013.

BACKGROUND

Field of Invention

The field of this invention relates to motors and more particularly to a motor which receives as input the force of gravity.

Description of Prior Art

There has been many noble attempts to design a mechanism that uses the force of an acceleration field, such as a gravity field, as the input energy to create mechanical advantage. A popular attempt has used an overbalanced wheel mechanism consisting of a series of weights in a vertical wheel arraignment that would create a arm moment greater on one side of the wheel than the opposite side. These mechanisms have been shown to not create significant mechanical advantage due to the fact that gravity would have to spin the wheel and provide necessary movement of the weight system at the same time. These two motions prove to be equal in required energy thus no significant mechanical advantage.

Another attempt is to use a buoyancy principle to create a mechanical advantage. This system would use the buoyancy of a less dense component in a surrounding more dense fluid, to rise against gravitational force, thus creating mechanical advantage. Here again the gravitational force would have to provide the energy to move the less dense component and provide the means to return the less dense component to the higher density fluid. These two movement prove to be equal in required energy thus no significant mechanical advantage.

While these designs tend to fail to provide adequate energy to successfully accomplish useful mechanical advantage, they are useful in the advancement of future designs such as that of the present invention.

What is needed to create a mechanical advantage from an acceleration field, such as gravity, is a mechanism that can dynamically affect a change in the normally balanced condition of a stationary mechanism existing in an acceleration field, using a secondary form of energy to create an imbalance in a balanced system. Previous attempts tend to be of a static nature where all components of the mechanism rely equally on gravitational force to affect an overall change in state without an secondary introduction of energy to create a dynamic state.

OBJECTS AND ADVANTAGES

Accordingly, several objects and advantages of the invention are:

(a) to provide a means to use an acceleration field, such as a gravity field, to create mechanical advantage in the form of rotational acceleration, in a singular direction of spin, of a weighted arm assembly.

(b) to provide a balanced system of weighted arms, whereby the introduction of motion of a third weighted arm, creates an imbalance within the system, thus creating a dynamic state affecting mechanical advantage in the form of rotational acceleration.

(c) to provide a means to harness the power of an acceleration field, such as a gravity field, to convert field force to a work force, to be used to spin a rotary power generating device, such as an electrical generator, hydraulic pump, etc.

(d) to provide a scalable system to create mechanical advantage in the form of rotational acceleration, that can be built at any suitable size, varying the masses and dimensions of the embodiment to increase or decrease the amount of available mechanical advantage.

(e) to provide a means to create a rotation of the gravity arm assembly, while maintaining a singular directional orientation of the counterweight arm assembly during motion, thus creating mechanical advantage in the form of rotational acceleration.

Further objects and advantages are to provide a means for creating a mechanical advantage in the form of rotational acceleration of a mass, to rotate any type of rotary power generating device, to provide a sustainable and pollution free source of energy. Still further objects and advantages will become apparent from a consideration of the ensuing description and drawings.

DRAWING FIGURES

Figure 2:
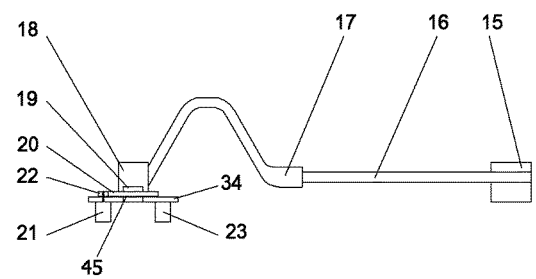
Figure 3:
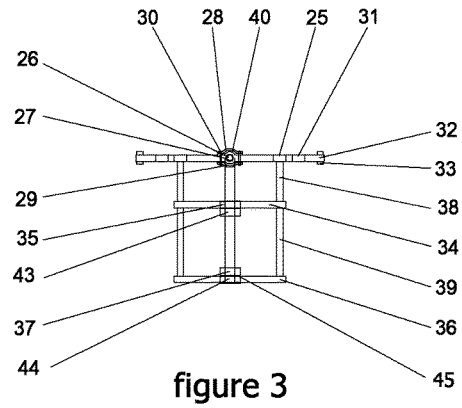
Figure 5:
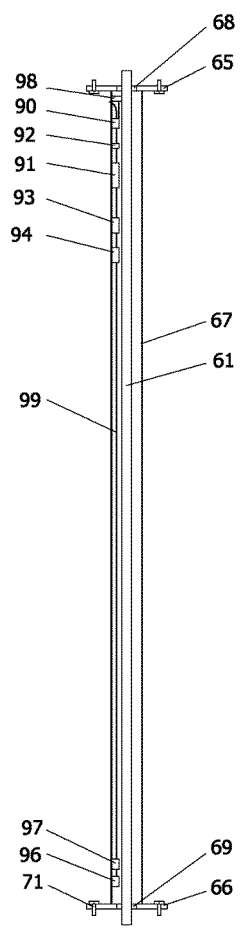
Figure 4:
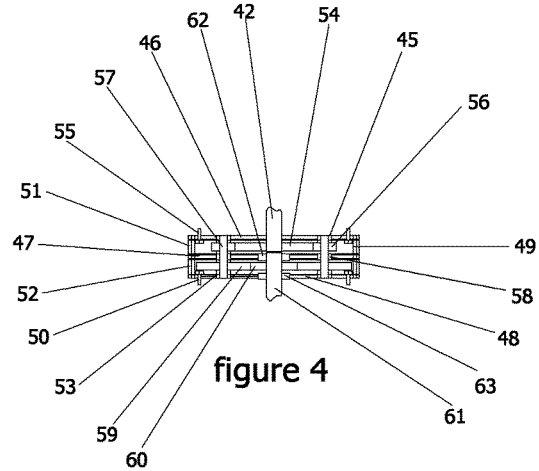
Figure 6:
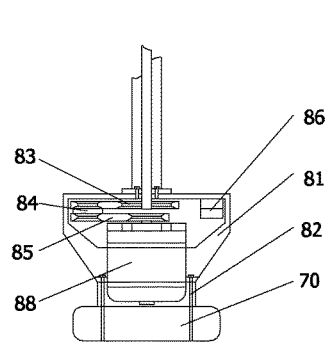
Figure 7:
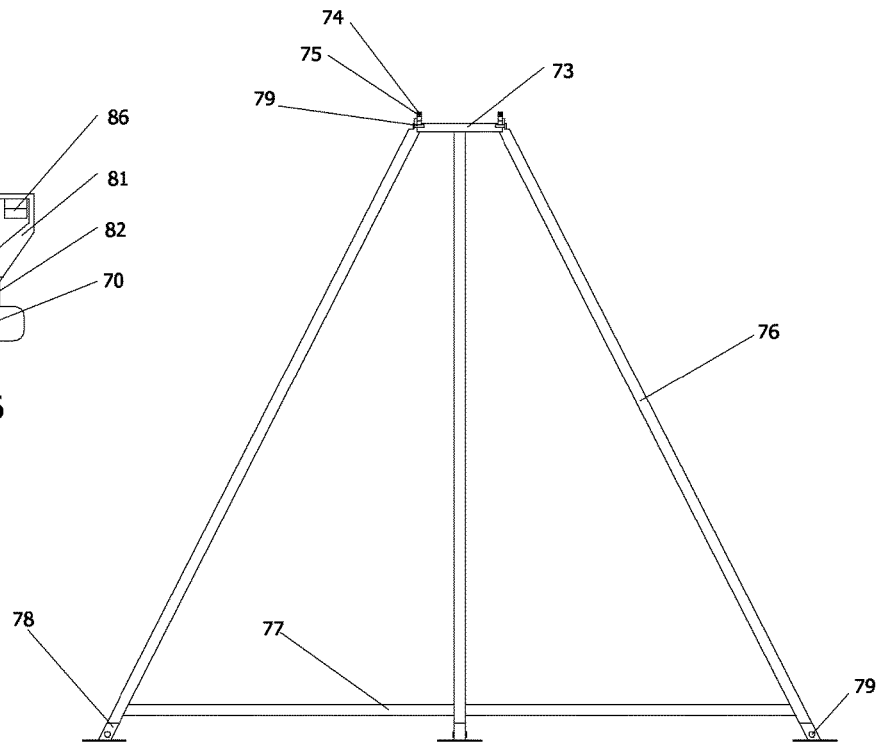
Figure 8:
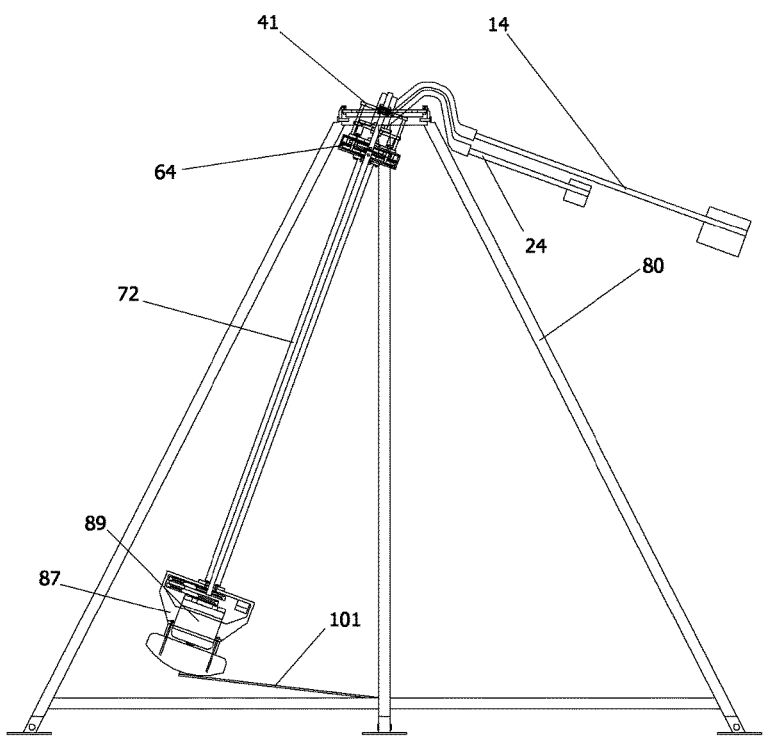
Figure 9:
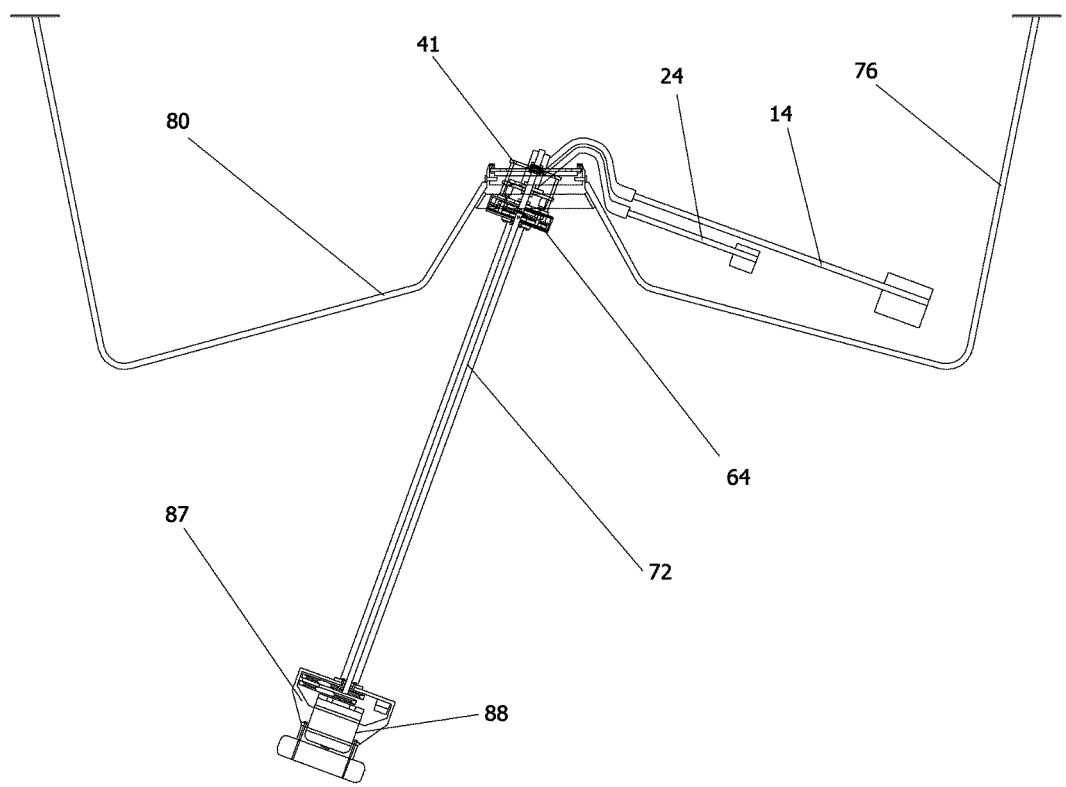
Figure 10:
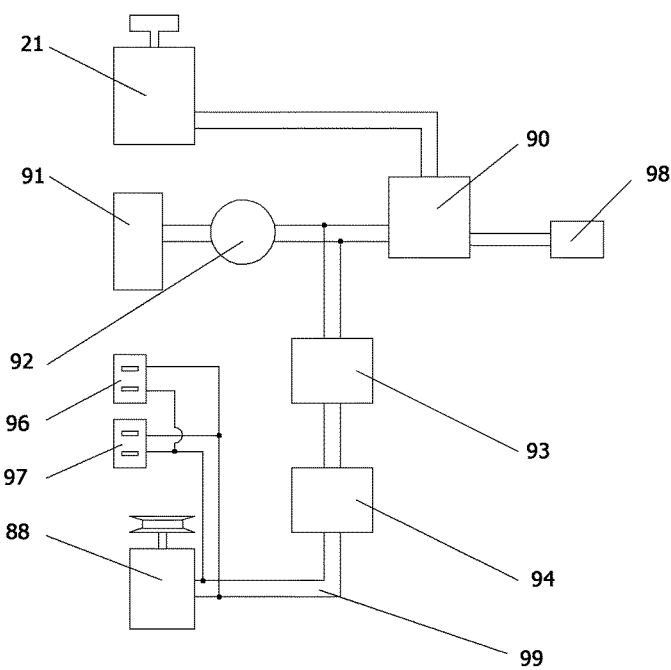

FIG. 1 is a detailed view of the gravity arm assembly.
FIG. 2 is a detailed view of the action arm assembly.
FIG. 3 is a detailed view of the gimbal assembly.
FIG. 4 is a detailed view of the gearbox assembly.
FIG. 5 is a detailed view of the counterweight arm and electrical control assemblies.
FIG. 6 is a detailed view of the attachment mounting assembly and a typical alternator.
FIG. 7 is a detailed view of the mounting stand assembly.
FIG. 8 is a view of the entire mechanism inset into the mounting stand assembly.
FIG. 9 is a view of an alternate embodiment of the mounting stand assembly.
FIG. 10 is a schematic of the electrical control assembly.

SUMMARY

In accordance with the present invention a mechanism to create rotational mechanical advantage from an acceleration field, such as a gravity field, consisting of a gravity arm assembly, and an action arm assembly, rotationally connected to a gimbal assembly. In balance with a perpendicularly oriented counterweight arm assembly rigidly connected to the gimbal assembly. Counterweight arm assembly is connected to a gearbox assembly at one end and a attachment mounting assembly at the opposite end. Gimbal assembly is rotationally connected to a mounting stand assembly. Attachment mounting assembly connects to a power generating device that is rotationally coupled to the gravity arm assembly via a gearbox assembly and a series of shafts.

DESCRIPTION—FIGS. 1 TO 10

A typical embodiment of the mechanism of the present invention consists of a gravity arm assembly 14, a action arm assembly 24, a gimbal assembly 41, a counterweight arm assembly 72 a gearbox assembly 64, a attachment mounting assembly 87, a mounting stand assembly 80, a electrical control assembly 100. Shown in FIG. 8. Detailed dimensions of a typical embodiment of a small mechanism are in parenthesis.

A gravity arm assembly 14 consists of a gravity weight 10, a gravity arm 11, a gravity arm arch 12, a gravity arm hub 13, a main shaft 42. Shown in FIG. 1.

A gravity weight 10 is a weight of a predetermined mass, (13.5 lbs) of a rectangular box shape, or other suitable shape, has a center bore that spans the longitudinal axis, constructed of high-density material such as cast iron or any other suitable material. A gravity arm 11 is a rod or tube of a predetermined length (17 in) and diameter (0.5 in), attached thru a center bore of weight 10 at one end, via a welded or other suitable connection. Gravity arm arch 12 is attached to the opposite end of arm 11 via a welded or other suitable connection. Arm arch 12 is an arch shaped structure, such as a tube or rod of predetermined diameter (1 in), bent in the shape of an arch or other suitable shape, of a predetermined height (6 in) and width (8 in), having a straight end of predetermined length (1 in). Gravity arm hub 13 is connected to arm arch 12, opposite a arm 11, via a welded or other suitable connection. Hub 13 is a cylindrical shaped component, of a predetermined length (2 in) and diameter (2 in), having a center bore that spans the vertical axis. Arm 11, Arm Arch 12, and Hub 13, are constructed of a light-weight, high-strength material such as aluminum alloy or other suitable material. The center bore of hub 13 accepts one end of a main shaft 42 via a press fit or other suitable means. Shaft 42 is a straight, round shaft of a predetermined length (12 in) and radius (0.1875 in), constructed of a suitable high-strength material such as a steel alloy. Shown in FIG. 1.

Action arm assembly 24, consists of a action weight 15, a action arm 16, a action arm arch 17, a action arm hub 18, a action arm bearing 19, a action arm drive gear 20, a action arm motor 21, a action arm motor gear 22, a action arm motor counterweight 23, a series of gear mount bolt 55, a series of machine screw 102. Shown in FIG. 2.

Action weight 15 is a weight of a predetermined mass (5.12 lbs), of a rectangular box shape or other suitable shape, has a center bore spanning the longitudinal axis, constructed of high-density material such as cast iron or any other suitable material. Weight 15 is typically of a smaller mass than Weight 10, approximately between 25% and 75% of the mass of weight 10. Action arm 16 is a rod or tube of a predetermined length (5 in) and diameter (0.5 in), attached thru the center bore of weight 15 at one end, via a welded or other suitable connection. Arm 16 is typically less than the length of a arm 11, approximately between 25% and 75% of the length of a arm 11. Action arm arch 17 is attached to the end of arm 16 opposite weight 15, via a welded or other suitable connection. Arm arch 17 is an arch shaped structure, such as a tube or rod of predetermined diameter (0.5 in), bent in the shape of an arch or other suitable shape, of a predetermined height (5 in) and width (7 in), having one straight end of predetermined length (1 in). Typically dimensioned to fit within the confines of the inner lower surface of a arm arch 12, allowing for proper clearance between arm arch 12 and arm arch 17. Action arm hub 18 connects to a arm arch 17 opposite arm 16, via a welded or other suitable connection. Hub 18 is a cylindrical shaped component of a predetermined length (2 in) and diameter (2 in), having a center bore spanning the vertical axis, and a series of threaded holes (10-32) in a radial pattern about the center bore to accept a series of a gear mount bolt 55. Arm 16, arm arch 17 and hub 18, are all constructed of a light-weight, high-strength material such as an aluminum alloy or other suitable material. Shown in FIG. 2.

A action arm bearing 19 (available from McMaster Carr Supply Co. Elmhurst, Ill.) is inset in the center bore of hub 18 via a press fit or other suitable means of mount. Bearing 19 is a singular standard axial bearing, or series of standard axial bearings, of suitable size and material, and could also be of a magnetic or frictionless type. A action arm drive gear 20 attaches to the bottom surface of hub 18 and is centered about bearing 19 as well as a center bore of hub 18. A action arm drive gear is typically a spur gear (2.5 in dia), or other suitable type of gear, with a center bore of a suitable size (0.375 in), constructed of a suitable material such as aluminum, attached to hub 18 via a series of three bolt 55 of appropriate size, material and length (10-32, aluminum, 0.5 in). A action arm motor 21 (available from Mouser Electronics, Mansfield, Tex.) mounts to a center plate 34 of assembly 41. Motor 21 is typically a commercially available, low speed, high torque motor of a suitable size and is mounted within a hole cut in plate 34, positioned so a action arm motor gear 22 (20 and 22 available from Boston Gear Co. Charlotte, N.C.) will mesh with gear 20, mounted via suitable method such as two machine screw 102 (6-32, aluminum, 0.5 in) mounted in holes (6-32) at either side of motor. Attached to the shaft of motor 21 is gear 22 (0.5 in dia). Gear 22 is a typically a spur gear, or other suitable type of gear, constructed of a suitable material such as aluminum, attached to the output shaft of motor 21 via suitable means such as press fit. Also attached to plate 34 is an action arm motor counterweight 23. Counterweight 23 is of a cylindrical (1 in ×1.5 in) shape, is constructed of a suitable material such as steel alloy, and has a mass equal to combined mass of motor 21, and gear 22. Counterweight 23 is mounted within holes (6-32) cut in plate 34 via a suitable method such as two screws 102 of appropriate size, material and length (6-32, aluminum, 0.5 in) in the same manner as motor 21, in a location as to balance plate 34 about its center of mass. Shown in FIG. 2.

Gimbal assembly 41 consists of a inner gimbal plate 25, a series of two inner gimbal shaft 26, a series of two inner gimbal bearing 27, a series of two upper inner bearing saddle 28, a series of two lower inner bearing saddle 29, a series of four of saddle mount bolt 30, a outer gimbal plate 31, a series of two outer gimbal shaft 32, a series of two outer gimbal bearing 33, a center plate 34, a center plate bearing 35, a lower gimbal plate 36, a lower gimbal plate bearing 37, a series of three inner gimbal/center mount rod 38, a series of three center/lower mount rod 39, a series of four vibration control gasket 40, a main shaft upper collar 43, a main shaft lower collar 44, a series of two thrust bearing 45. Shown in FIG. 3.

A inner gimbal plate 25 is a flat, ring shaped plate, or other suitable shape, with a predetermined diameter (4 in), constructed of sheet aluminum (0.25 in), or other high-strength, low-weight material. Plate 25 has a center hole of predetermined diameter (3 in), a series of two slots of predetermined length (0.5 in) and width (0.375 in), set 180 degrees apart, cut perpendicular to the outer radius, extending approximately half the distance between inner and outer radii, and a series of smaller holes of predetermined diameter (0.25 in) set at regular intervals (120 degrees) within a set distance (0.25 in) near the outer radius. A series of two inner gimbal shaft 26 consist of a straight, round shaft of a predetermined length (1.25 in) and diameter (0.375 in), constructed of a suitable high-strength material such as a steel alloy, align with slots in plate 25, and connect via a welded or other suitable connection. Shown in FIG. 3.

A outer gimbal plate 31 is a flat, ring shaped plate or other suitable shape, with an inner diameter (4.5 in) larger than the outer radius of a plate 25, and outer radius of a predetermined diameter (5.5 in), constructed of sheet aluminum (0.25 in), or other high-strength, low-weight material. A series of two slots of predetermined length (0.5) and width (0.3125), set 180 degrees apart, are cut perpendicular to the inner radius, extending approximately half the distance between inner and outer radii. A second series of two slots of predetermined length (0.5 in) and width (0.375), set 180 degrees apart, and 90 degrees from first series of slots, are cut perpendicular to the outer radius, extending approximately half the distance between outer and inner radii. A series of two outer gimbal shaft 32, consist of a straight, round shaft of a predetermined length (1.25 in) and diameter (0.375), constructed of a suitable high-strength material such as a steel alloy, align with slots cut in the outer radius of plate 31, and connect via a welded or other suitable connection. Shown in FIG. 3.

A series of two inner gimbal bearing 27 (available from McMaster Carr Supply Co. Elmhurst, Ill.), consist of a series of standard radial bearings, of suitable size and material, and could be of the magnetic or frictionless type, are inset at the slots cut perpendicular to the inner radius of a plate 31. Bearing 27 accept shaft 26, thus plate 25 connects and pivots within plate 31. A series of two outer gimbal bearing 33 (available from McMaster Carr Supply Co. Elmhurst, Ill.), consist of a series of standard axial bearings, of a suitable size and material, and could be of the magnetic or frictionless type, accept shaft 32, thus plate 31 connects and pivots within a outer mounting stand collar 73, a part of a mounting stand assembly 80. Shown in FIG. 3 and FIG. 8.

A upper inner bearing saddle 28 and a lower inner bearing saddle 29 mount to plate 31, on opposite sides, centered on shaft 26, via a series of a saddle mount bolt 30 of appropriate size, material and length (10-32, aluminum, 1 in), connected thru holes (10-32) cut in plate 31 at appropriate positions. Saddle 28 and saddle 29 mirror each other, constructed of formed aluminum sheet (0.125 in), or a suitable high-strength light-weight material, having an inner and outer radius equal to that of plate 31, with sides a set distance along the radius of plate 31 (30 degrees either side of center), a formed radius perpendicular to inner and outer radii at center of saddle to accept bearing 27 and a vibration control gasket 40, a hole cut near each end to accept bolt 30. Gasket 40 is constructed of a flexible rubber or appropriate material and thickness (0.090 in thick), and fits the inner surface of either saddle 28 or saddle 29. Saddle 28 and saddle 29 sandwich bearing 27, gasket 40, and plate 31. Shown in FIG. 3.

Plate 34 is a flat, ring shaped plate, or other suitable shape, with a predetermined diameter (3 in), constructed of sheet aluminum, or other high-strength, low-weight material. Plate 34 has a center hole the diameter of a center plate bearing 35, and a series of smaller holes of predetermined diameter (0.25 in) set at regular intervals (120 degrees) within a set distance (0.25 in) near the outer radius, in the same pattern as found on plate 25. Shown in FIG. 3.

Plate 34 also positions assembly 14 and assembly 24 so that they are close to the axis plane of a gimbal assembly 41. This is important because the movement of the arm assemblies are most efficient at or near the central plane of assembly 41. Plate 25 connects to plate 34 via a series of three inner gimbal/center mount rod 38, constructed of aluminum rod, or a suitable high-strength, light-weight material, of predetermined length (2.625 in) and diameter (0.25 in), attached via a welded or other suitable connection. Shown in FIG. 3.

A lower gimbal plate 36 is a flat, ring shaped plate, or other suitable shape, with a predetermined diameter (3 in), constructed of sheet aluminum (0.25 in), or other high-strength, low-weight material. Plate 36 has a center hole the diameter of a lower gimbal plate bearing 37, and a series of smaller holes of predetermined diameter (0.25 in) set at regular intervals (120 deg) within a set distance (0.25) near the outer radius, in the same pattern as found on plate 34. Plate 36 connects to plate 34 via a series of three center/lower mount rod 39, constructed of aluminum rod, or a suitable high-strength, light-weight material, of a predetermined length (3.25 in) and diameter (0.25 in), attached via a welded or other suitable connection. Shown in FIG. 3.

Center plate bearing 35, consist of a standard axial bearing, of a suitable size and material, and could be of the magnetic or frictionless type, is set into the center hole of plate 34 via suitable means such as press fit. Lower gimbal plate bearing 37 (35 an 37 available from McMaster Carr Supply Co. Elmhurst, Ill.), identical to bearing 35, is set into the center hole of plate 36 via suitable means such as press fit. Shaft 42 of assembly 14, is received by bearing 19 of assembly 24. Shaft 42 is then received by bearing 35, and bearing 37. A main shaft upper collar, typically a standard shaft collar, or other suitable collar, is attached to shaft 42 below bearing 35. A main shaft lower collar 44 (43 and 44 available from McMaster Carr Supply Co. Elmhurst, Ill.), identical to collar 43, is attached to shaft 42 above bearing 37. A thrust bearing 45 (available from McMaster Carr Supply Co. Elmhurst, Ill.) is set between hub 13 and hub 18, between gear 20 and plate 34. Shown in FIG. 3.

A gearbox assembly 64 consists of a gearbox upper plate 46, a gearbox mid plate 47, a gearbox lower plate 48, a series of three gearbox up/mid/low mount rod 49, a series of three gearbox mounting bolt 50, a gearbox upper housing 51, a gearbox lower housing 52, a series four gearbox gasket 53, a main shaft gear 54, a series of three gear mount bolt 55, a series of three top transfer gear 56, a series of three transfer gear shaft 57, a series of nine transfer gear shaft bearing 58, a series of three bottom transfer gear 59, an output gear 60, an output gear shaft 61, an output gear upper bearing 62, and an output gear lower bearing 63. Shown in FIG. 4.

A gearbox upper plate 46 is a flat, ring shaped plate, or other suitable shape, with a predetermined diameter (3 in), constructed of sheet aluminum (0.125 in), or other high-strength, low-weight material. Plate 46 has a center hole large enough to accept a main shaft gear 54. Three holes of predetermined diameter (0.25 in), are cut at regular intervals (120 deg) a set distance (0.25 in) from the outer radius to accept a series of three gearbox up/mid/low mount rod 49, constructed of aluminum rod, or a suitable high-strength, light-weight material, of a predetermined length (1.75 in) and diameter (0.25 in), and connected via a welded connection or other suitable means. A series of three holes of predetermined diameter (0.3125 in), cut 120 degrees apart at a precise distance from the center hole to allow for gear mesh. A gearbox mid plate 47 and a gearbox lower plate 48 are identical to plate 46, with the exception of the center hole is of a radius to accept a output gear upper bearing 62 in plate 47, and a output gear lower bearing 63 (62 and 63 available from McMaster Carr Supply Co. Elmhurst, Ill.) in plate 48 via press fit. A series of nine transfer gear shaft bearing 58 (available from McMaster Carr Supply Co. Elmhurst, Ill.), a series of standard sleeve bearings, of suitable size and material, are set within the aforementioned series of three holes on each plate, via suitable means such as press fit. Bearing 62 and bearing 63 consist of a standard radial bearing, of suitable size and material, and are set into center holes of plate 47 and plate 48 respectively. Shown in FIG. 4.

A gearbox upper housing 51 and a gearbox lower housing 52 are thick, flat, ring shaped components, of a predetermined thickness (0.75 in), with an inner radius large enough to encompass inner components of assembly 64, having an outer radius same as plate 46, and constructed of a lightweight cast aluminum or other suitable material. Housing 51 mounts between a series of two gearbox gasket 53, constructed of a soft rubber material having the same shape as housing 51 or housing 52, sandwiched between plate 46 and a plate 47, and have holes to accept rod 49. Housing 52 is identical to housing 51 but mounts between plate 47 and plate 48. Assembly 64 mounts to assembly 41 using a gear box mount bolt 50 via holes cut (10-32) in both plate 36 and plate 46 at regular intervals (120 deg), near the outer radius of the plate (0.25 in). Shown in FIG. 4.

A main shaft gear 54 attaches to shaft 42 via suitable means such as press fit, positioned within center radius of plate 46, above plate 47, and within housing 51, and meshes with a series of three top transfer gear 56. Gear 56 mount to one end of a transfer gear shaft 57, and a bottom transfer gear 59 mounts to the opposite end, via suitable means such as press fit. Shaft 57 and attached gears are set in bearing 58 of all three gearbox plates at all three bearing locations. Gear 56 is set between plate 46 and a plate 47 and within housing 51. Gear 59 is set between plate 47 and plate 48 and within housing 52, and meshes with an output gear 60. Gear 60 is attached to an output gear shaft 61 via suitable means such as press fit. Shaft 61 is set in bearing 62 and a output gear lower bearing 63. Gear 60 is set between plate 47 and plate 48, in line with shaft 42 and within housing 52. A series of four thrust bearing 45 are set on shaft 57 between gear 56 and bearing 58 at plate 47, between gear 59 and bearing 58 at plate 47, between gear 60 and bearing 62, and between gear 60 and bearing 63. Gear 54, gear 56, gear 59, and gear 60, (available from Boston Gear Co., Charlotte, N.C.) are typically spur gears, or other suitable type of gear, with a center bore and thickness of suitable size, constructed of suitable material such as aluminum. The gear train of assembly 64 is a speed increasing (1 to 10) gear train (0.375 in to 1.875 in), thus gear sizes are determined accordingly. Shown in FIG. 4.

A counterweight arm assembly 72 consists of a counterweight arm top plate 65, a counterweight arm bottom plate 66, a counterweight arm housing 67, a counterweight arm top bearing 68, a counterweight arm bottom bearing 69, a counterweight 70 and a series of three counterweight mount bolt 71. Shown in FIG. 5.

A counterweight arm top plate 65 is attached to one end of a counterweight arm housing 67, and a counterweight arm bottom Plate 66 attaches to the opposite end, via a welded or other suitable connection, and are constructed of aluminum sheet (0.25 in) or other suitable material. Housing 67 is a tubular component of a predetermined length (14.375 in) and diameter (2 in), constructed of aluminum or other suitable material. Plate 65 and plate 66 are identical, have same shape and dimensions as plate 48, with a center hole cut inline with the center housing 67, and have a series of three smaller holes (0.25 in) cut near (0.25 in) outer radius to accept bolt 71. Inset into the center hole of plate 65 is a counterweight arm top bearing 68, Inset into the center hole of plate 66 is a counterweight arm bottom bearing 69 (68 an 69 available from McMaster Carr Supply Co. Elmhurst, Ill.) via suitable means such as press fit. Both bearings consist of a standard radial bearing, of a suitable size and material. These bearings accept shaft 61. Assembly 72 attaches to a assembly 64 with a series of three bolts 71 via holes cut in a plate 65, inline with holes cut in plate 48. An attachment mounting assembly 87 attaches to assembly 72 with a series of three bolts 71 via holes cut in plate 66, inline with holes cut in an attachment mount bracket 81. Action arm counterweight 70 attaches to the bottom surface of attachment mount bracket 81 of the attachment mounting assembly 87 via bolts 71. Shown in FIG. 5.

An attachment mounting assembly 87 consists of attachment mount bracket 81, a series of three attachment mount bolt 82, a output gear shaft pulley 83, a idler/tension pulley 84, a drive belt 85, a attachment counterweight 86. Assembly 87 attaches user supplied commercially available alternator 88, commercially available pump 89, or other rotary attachments. Shown in FIG. 6

An attachment mounting bracket 81 consists of an attachment specific bracket, made of aluminum sheet or other suitable materials, contoured to fit a specific attachment such as a commercially available alternator 88. This bracket would have a upper flat surface to connect with the end of the counterweight arm assembly 72 via bolts 81. A lower flat surface would connect the Counterweight 70 via bolts 82. The upper surface of bracket 81 has a center void to accept the end of shaft 61. The assembly 87 may have a belt system consisting of a output gear shaft pulley 83, a idler/tension pulley 84, a drive belt 85, and or attachment counterweight 86 (83-85 available from McMaster Carr Supply Co. Elmhurst, Ill.) all dependant on the attachment such as a commercially available alternator 88, or commercially available pump 89. Shown in FIG. 6 and FIG. 8.

An electrical control assembly 100 consists of a motor control circuit 90, a motor start-up battery 91, a motor start-up solenoid 92, a input power rectifier circuit 93, a input power voltage regulator 94, a external power source 95, a output power receptacle 96, a input power receptacle 97, a sensor 98, a series of electrical connection wire 99. Shown in FIG. 5 and FIG. 10.

Motor 21 is electrically connected to a motor control circuit 90. All electrical connections are via a series of electrical connection wires 99 of proper gauge. Control circuit 90, a commercially available programmable motor controller (available from Adafruit Industries, New York, N.Y.) that delivers power to motor 21, connected to a sensor 98 (available from Adafruit Industries, New York, N.Y.). Sensor 98 is a magnetic rpm sensor that determines rpm of shaft 61 to allow control circuit 90 to adjust electrical power accordingly. A motor start-up solenoid 92 (available from Mouser Electronics, Mansfield, Tex.) is a commercially available, normally open, single pole solenoid, electrically connected between control circuit 90 and a motor start-up battery 91. Battery 91 (available from Mouser Electronics, Mansfield, Tex.) is a commercially available battery that meets the power requirements of control circuit 90. A input power rectifier circuit 93 (available from Mouser Electronics, Mansfield, Tex.) is a commercially available rectifying circuit designed to turn AC to DC power, and is electrically connected in parallel to battery 91 and control circuit 90. A input power voltage regulator 94 (available from Mouser Electronics, Mansfield, Tex.) is a commercially available voltage regulating circuit that that meets the power requirements of control circuit 90, and is electrically connected to rectifier circuit 93 and provides charge voltage to battery 91. A input power receptacle 97 is a three conductor female receptacle that flexibly extends from housing 67, and is electrically connected to voltage regulator 94, and connects to an external power source 94. A output power receptacle 96 (96 and 97 available from Mouser Electronics, Mansfield, Tex.) is a three conductor female receptacle that flexibly extends from housing 67 and electrically connects to voltage regulator 94 and to a wire harness of a commercially available alternator 88 when used as the attached rotary generating device. Shown in FIG. 5 and FIG. 10.

A mounting stand assembly 80 consists of a mounting stand collar 73, a set of two mounting stand collar saddle 74, a series of four mounting stand collar saddle bolt 75, a set four of mounting stand leg 76, a series of two mounting stand leg support 77, a set of four mounting stand foot pad 78, a series of mounting stand bolt 79, a swing tether 101 or a movement limit stop 103. Shown in FIG. 7.

A mounting stand collar 73 consists of a round collar, constructed of a steel alloy or other suitable material, of a predetermined radius, depth and thickness, having two flat tabs extending upward a set distance above the upper surface of the collar, set 180 degrees apart, having a flat upper surface with a round notch at center of upper surface to accept bearing 33, and two hoes cut on either side to accept mounting stand collar saddle bolt 75. A mounting stand collar saddle 74, similar to saddle 28 but dimensioned to fit collar 73, is seated above bearing 33. Sandwiched in between is gasket 40. Saddle 74 is attached to collar 73 via a series of two bolts 75 of appropriate size, material and length (10-32, alum, 0.5 in). Shown in FIG. 7.

Attaching to outer side surface of collar 73 are a series of a mounting stand legs 76 constructed of a formed steel tube or other suitable material, shaped in such a way to allow for unimpeded movement of mechanism, set at regular intervals such as 90 degrees apart, and attached via mounting stand bolt 79 connection. Attached to the end of legs 76 is a mounting stand foot pad 78 constructed of steel plate or other suitable material, and attached via mounting stand bolt 79. A mounting stand leg support 77 constructed of steel tube or other suitable material, attached via mounting stand bolt 79, between opposing legs 76. Shown in FIG. 7.

Additionally, a Swing Tether 101, a flexible strap, is attached to the intersection of the supports 77 that connects to the bottom weight 70 to limit perturbations in the circular swing of mechanism. Or a movement limit stop 103, a conical ring mounted below collar 73, can be used to limit swing angle of the mechanism. or Shown in FIG. 8 and FIG. 9.

As previously stated, detailed dimensions of a typical embodiment of a small mechanism are in parenthesis. This mechanism would have the following approximate specifications: Gravity arm assembly 14: mass (13.5 lbs), arm (24 in), action arm assembly 24: mass (5.12 lbs), arm (16 in), counterweight arm assembly: mass (16.93 lbs), arm (36 in) approx operating angle (28 deg), approx tilt angle (5 deg), approx gravity arm output (128 w at 60 rpm, 256 w at 120 rpm).

The present invention may be embodied in other specific forms without departing from the essential attributes thereof. Reference should be made to the appending claims rather than the foregoing specification as indicating the scope of the invention.

OPERATION—FIGS. 1 TO 8

The main embodiment of the present invention is designed to translate the potential energy found in an acceleration field, such as a gravity field, to rotational acceleration of a weighted arm known as the gravity arm assembly 14. This is accomplished using a secondary weighted arm known as a action arm assembly 24. These two assemblies are balanced, thru the gimbal assembly 41, by a third arm assembly known as the counterweight arm assembly 72. The counterweight arm assembly 72 is oriented perpendicular to the two aforementioned arms, and attaches thru the gimbal assembly 41. Typically, the individual masses and arm lengths of each weighted arm assembly are of a value that create a tilt of between 5-40 degrees of the parallel planes of the gravity arm assembly 14 and action arm assembly 24, from the horizontal plane of the mechanism. This will create an approximate 5-40 degree tilt of the counterweight arm assembly 72 from the vertical plane of the mechanism, tilting the counterweight arm assembly 72 to the opposite side, approximately 5-40 degrees, from the two other arms. It is the interaction between these three arm assemblies that create an imbalance within the mechanism, when rotational energy is applied to the action arm assembly 24, thus rotation of the gravity arm assembly 14, and swing of the counterweight arm assembly 72. Refer to FIG. 8.

As the action arm assembly 24 rotates, the gravity arm assembly 14 rises slightly in angle relative to the horizontal plane of the mechanism. The counterweight arm assembly 72 falls slightly in angle from the vertical plane of the mechanism. Both arms experience a vector of force in the angular direction of the moving action arm assembly 24, caused by a tilting of the gimbal assembly 41 and an overall change in center of gravity, in the direction of the action arm assembly 24 position. As this motion continues the position of the action arm assembly 24, and thus the tilt of the gimbal assembly 41, is continuously ahead of the rotation of the gravity arm assembly 14. The counterweight arm assembly 72 begins to swing in the same angular direction as the action arm assembly 24. The swing is in response to the change in center of gravity created by the movement of the action arm assembly 14, the tilting of the gimbal assembly 41, and the movement of the gravity arm assembly 14. By this effect the system begins to move about the vertical center axis of the gimbal assembly 41. Refer to FIG. 8.

It is important to note that the gravity arm assembly 14 rotates while the counterweight arm assembly 72 swings about the vertical center axis of the gimbal assembly 41. The gimbal assembly 41 is what allows the device to tilt in any direction but still maintain a lateral orientation. This is important because the counterweight arm assembly 72 must maintain a particular lateral orientation; i.e. point in the same direction. If it did not, the gravity arm assembly 14 would not be able to turn its connected shaft but would turn the entire mechanism instead. The main components of the gimbal assembly 41 is the inner gimbal plate 25 and the outer gimbal plate 31. These two plates and their associated parts, form the basis of the 2 dimensional movement allowing the arm assemblies to move in the proper manner. Refer to FIG. 3 and FIG. 8.

The action arm assembly 24 requires continuous input of power for movement, while the gravity arm assembly 14 and the counterweight arm assembly 72 move in response to a change in center of gravity. Thus they receive energy directly from the acceleration field, in this case a gravitational field. The overall rate of spin of the mechanism is directly affected by the angular speed of the action arm assembly 24. Therefore the action arm assembly 24 is used as a throttle or governor of the mechanism. By varying the amount of electrical power applied to the action arm motor 21, the rotation of the mechanism can be precisely controlled.

The gravity arm assembly 14 contains a gravity arm arch 12 in the construction. This component is essentially an arch-shaped extension of the shaft designed to allow the arm to tilt without hitting the underlying gimbal assembly 41 or the attached mounting stand assembly 80. The action arm assembly 24 is a shorter lighter version of the gravity arm assembly 14. It also has an action arm arch 17 similar to the gravity arm assembly 14, rotating within the gravity arm arch 12, spaced vertically so as to provide for clearance of the gravity arm arch 12, thus allowing independent rotation of both components. Refer to FIG. 1, FIG. 2, and FIG. 8.

The electrical control assembly 100 is the assembly that controls the action arm motor 21 and hence the primary operation of the mechanism. It also allows for the input and output of electrical energy. For example, input of electricity when a commercially available pump 89 is attached or output of electricity when a commercially available alternator 88 is attached. The motor control circuit 90 controls the input power to the action arm motor 21 and thus controls the motor speed. It has the ability to regulate the voltage and or current to the drive motor and increase or decrease the voltage and or current according to the rotation of the gravity arm assembly 14. A Sensor 98 is attached to the motor control circuit 90 to read the output gear shaft 61 rotation and thus the speed of the gravity arm assembly 14. A motor start-up battery 91 is connected to a motor start-up solenoid 92 then to the motor control circuit 90. The motor start-up battery 91 allows for start-up power for the system before external power or internal power is established. The motor start-up solenoid 92 can be turned on or off by the motor control circuit 90. Connected in parallel between the motor start-up solenoid 92 and the motor control circuit 90 is the input power rectifier circuit 93 that is connected to the input power voltage regulator circuit 93. These two components condition the power supplied to the motor control circuit 90 to ensure proper voltage and amperage. The input power voltage regulator circuit 94 is both connected to an input power receptacle 97 and a the output power receptacle 96 via electrical connection wire 99. The input power receptacle 97 and the output power receptacle 96 are used to supply power from an external power source 95 to the motor control circuit 90, Send output power created by an electrical generating attachment, supply power to the Motor Control Circuit 90 while performing testing or maintenance. Refer to FIG. 5 and FIG. 10.

The mechanism is set up with the mounting stand assembly 80 on a level surface or near level surface. An attachment is connected to the attachment mounting assembly 87, such as a commercially available alternator 88 or a commercially available pump 89. The alternator harness is connected to the input power receptacle 97. If the mechanism is being used to generate electricity, a output power harness is connected to the output power receptacle 96. Both the alternator harness and the power harness are not part of the present invention, instead are part of the attachment supplied by the user. If the mechanism is being used with a non-electrical attachment such as a hydraulic pump, or other device, an external power source 95 is connected to the input power receptacle 97, via a user supplied power harness.

Once setup is complete and all components are attached and secured, the motor control circuit 90 is energized via a remote control. It is important to note that the motor control circuit 90 would typically have the ability to be controlled via a remote control. This remote control is considered part of the motor control circuit 90 and not part of the present invention. The action arm assembly 24 begins to slowly turn while the gravity arm assembly 14 begins to follow. The counterweight arm assembly 72 starts to swing in a circle in the same angular direction as the action arm. Speed increases as the motor control circuit 90 continues to increase power to the action arm. The motor control circuit 90 monitors the speed of the output gear shaft 61 until the gravity arm assembly 14 reaches the pre-programmed operating rpm. The motor control circuit 90 now maintain speed with small changes in the input power until shutdown.

CONCLUSION, RAMIFICATIONS AND SCOPE

Accordingly the reader will see that the mechanism of this invention provide a means to use an acceleration field to create mechanical advantage in the form of rotational acceleration. This mechanism solves several problems of generating usable energy from gravity. First, it uses a secondary form of energy to create a changing or dynamic center of gravity thus creating the rotational motion of the arm assembly. Electricity is used to rotate the action arm assembly instead of gravity. Second, the amount of energy needed to rotate the action arm assembly is less than the amount of energy created by the larger gravity arm assembly. Third, the power needed to rotate the gravity arm assembly and swing the counterweight assembly is provided by gravity, the energy needed to spin the smaller action arm assembly is provided by an input of electrical energy that can be generated by the larger gravity arm assembly. Thus the mechanism could power itself and with the proper dimensions create excess power.

The mechanical advantage created by this mechanism can be used to turn a variety of rotary power generating devices. Alternators can be used to generate electricity. Pumps can be used to create hydraulic pressure to power hydraulic systems or move liquids thru a line. Air pumps can be used to create pressurized air to power pneumatic systems.

The mechanism of this invention will rotate a variety of rotary power generating devices while creating no pollution and using no volatile fuels. If it is used to generate electricity, this mechanism can out perform current renewable technologies such as solar cells and wind turbine by being able to run continuously day or night. Solar cells are limited by available daylight hours, and wind turbines are limited by the strength and constancy of the wind. This mechanism can be mounted anywhere it has space to turn with no special requirements, where solar cells need direct sunlight or special placement, or wind turbines need high placement in wind prone areas.

The mechanism of this invention is scalable meaning it can be made to any reasonable size. A large embodiment of the invention could be made to create megawatts of electricity. A series of these mechanisms could be wired in series to allow for a grid-tied power generating station. Small versions could provide for a portable generating station to be used in disaster relief. Among many other possible uses.

Although the aforementioned description contains many specificities, these should not be construed as limiting the scope of the invention, but merely providing illustrations of some of the presently preferred embodiments of this invention.

For example, an additional embodiment of the current invention would include an electrical generating device and a non-electric device mounted at the attachment mounting assembly to eliminate the need for external power source. Additionally, a small alternator could mount along the output gear shaft with an attached gear train or belt drive to provide rotation and thus provide sustained power to the electrical control assembly and electrically connected action arm motor.

An additional embodiment of the current invention would use a square mounting assembly could be used that extended above the plane of the rotating arms creating a structure to allow units to be stacked upon one another thus conserving space. A mounting assembly that mounted to a ceiling, consisting of an upwardly angled mounting stand assembly instead of the current downward angle. Shown in FIG. 9.

An additional embodiment of the current invention would attempt to reduce the aerodynamic drag of the arm assemblies by streamlining the components, operating the entire mechanism within a full or partial vacuum, or within a rotating volume of air or other gases.

Thus the scope of the invention should be determined by the appended claims and their legal equivalents, rather than by the given examples.

I claim:

1. A mechanism to create rotational mechanical advantage from an acceleration field, consisting of:
    a common pivot axis in the form of a gimbal assembly comprised of an inner plate gimbal within an outer plate gimbal, whereas said inner plate gimbal pivots about a horizontal center axis, said outer plate gimbal pivots about a horizontal center axis oriented 90 degrees from said inner plate center axis,
    a first weighted arm assembly of a predetermined mass, having a center of mass at a predetermined distance from a center axis, whereas said first weighted arm assembly rotationally connects horizontally to said common pivot axis,
    a second weighted arm assembly of a predetermined mass, having a center of mass at a predetermined distance from a center axis, having a means for controlled powered rotation about said center axis, whereas said second weighted arm assembly rotationally connects horizontally to said common pivot axis, adjacent to said first weighted arm assembly,
    a third weighted arm assembly comprised of a series of interconnected assemblies, of a combined predetermined mass, having a combined center of mass a predetermined distance from a center axis, whereas said third weighted arm assembly rigidly connects vertically to said common pivot axis,
    a mounting assembly to support said mechanism comprising a collar rotationally connected to said horizontal center axis of said outer plate gimbal, said collar connects to a series of legs and connected leg support members,
    a means of controllably coupling a rotational mechanical advantage of said first weighted arm assembly to a power generating device.

2. The device of claim 1 wherein said first weighted arm assembly contains an arch shaped structure of predetermined dimensions.

3. The device of claim 1 wherein said second weighted arm assembly contains an arch shaped structure of predetermined dimensions.

4. The device of claim 1 wherein said second weighted arm assembly is powered by an electric motor and gear train for powered rotation.

5. The device of claim 4 wherein said electric motor is controlled by a motor controller circuit selected from the group consisting of motor control circuits.

6. The device of claim 1 wherein said first weighted arm assembly connects to a shaft at said center axis, for transfer of said rotational mechanical advantage.

7. The device of claim 1 wherein said series of interconnected assemblies includes a gearbox assembly for increasing rotational speed of said rotational mechanical advantage.

8. The device of claim 1 wherein said series of interconnected assemblies includes a mounting assembly for mount of said power generating device.

9. The device of claim 1 wherein said common pivot axis allows rotation of said first weighted arm assembly, rotation of said second weighted arm assembly, whereas said third weighted arm assembly swings with a single directional orientation.

10. A mechanism to create rotational mechanical advantage from an acceleration field, consisting of:
    a means to form a common pivot axis,
    at least one first weighted arm assembly of a predetermined mass, having a center of mass at a predetermined distance from a center axis, whereas said first weighted arm assembly rotationally connects horizontally to said common pivot axis,
    at least one second weighted arm assembly of a predetermined mass less than the first weighted arm, having a center of mass at a predetermined distance from a center axis less than the first weighted arm, having a means for controlled powered rotation about said center axis, whereas said second weighted arm assembly rotationally connects horizontally to said common pivot axis, adjacent to said first weighted arm assembly,
    at least one third weighted arm assembly comprised of a series of interconnected assemblies, of a combined predetermined mass, having a combined center of mass at a predetermined distance from a center axis, whereas said third weighted arm assembly rigidly connects vertically to said common pivot axis,
    a means to pivotally mount and support said mechanism,
    a means of controllably coupling a rotational mechanical advantage of said first weighted arm assembly to a power generating device.

11. The device of claim 10 wherein said first weighted arm assembly contains an arch shaped structure of predetermined dimensions.

12. The device of claim 10 wherein said second weighted arm assembly contains an arch shaped structure of predetermined dimensions.

13. The device of claim 10 wherein said second weighted arm assembly is powered by an electric motor and gear train for powered rotation.

14. The device of claim 13 wherein said electric motor is controlled by a motor controller circuit selected from the group consisting of motor control circuits.

15. The device of claim 10 wherein said first weighted arm assembly connects to a shaft at said center axis, for transfer of said rotational mechanical advantage.

16. The device of claim 10 wherein said series of interconnected assemblies includes a gearbox assembly for increasing rotational speed of said rotational mechanical advantage.

17. The device of claim 10 wherein said series of interconnected assemblies includes a mounting assembly for mount of said power generating device.

18. The device of claim 10 wherein said common pivot axis allows rotation of said first weighted arm assembly, rotation of said second weighted arm assembly, whereas said third weighted arm assembly swings with a single directional orientation.

\* \* \* \* \*